(12) United States Patent
Anderson (10) Patent No.: US 9,330,478 B2
(45) Date of Patent: May 3, 2016

(54) AUGMENTED REALITY CREATION USING A REAL SCENE

(75) Inventor: Glen J. Anderson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 13/995,491

(22) PCT Filed: Feb. 8, 2012

(86) PCT No.: PCT/US2012/024267
§ 371 (c)(1),
(2), (4) Date: Jun. 18, 2013

(87) PCT Pub. No.: WO2013/119221
PCT Pub. Date: Aug. 15, 2013

(65) Prior Publication Data
US 2013/0307875 A1 Nov. 21, 2013

(51) Int. Cl.
*G09G 5/00* (2006.01)
*G06T 11/00* (2006.01)
(Continued)

(52) U.S. Cl.
CPC ............... *G06T 11/00* (2013.01); *A63F 13/213* (2014.09); *A63F 13/42* (2014.09); *A63F 13/65* (2014.09); *A63F 13/92* (2014.09); *G06F 3/017* (2013.01); *G06F 3/0486* (2013.01); *G06F 3/04815* (2013.01); *G06F 3/04883* (2013.01); *G06T 19/006* (2013.01); *H04N 5/272* (2013.01); *G06F 1/163* (2013.01); *G06F 3/005* (2013.01); *G06F 3/011* (2013.01); *G06F 3/04817* (2013.01)

(58) Field of Classification Search
CPC ......... G06F 3/011; G06F 3/017; G06F 1/163; G06F 3/005; G06F 3/0426; G06F 3/04815; G06F 3/04883; G06F 3/486; G06F 3/04817; G02B 27/017; G06T 19/006; H04N 13/044; H04N 21/44218; H04N 5/272; H04N 7/147; H04N 7/15; H04N 7/157; G06K 9/00671
USPC ......... 345/632, 633, 634, 156–158, 419, 420, 345/629, 473, 646, 659, 672; 715/863, 203, 715/702, 757; 382/103, 154, 181, 203, 305
See application file for complete search history.

(56) References Cited

U.S. PATENT DOCUMENTS

2010/0199232 A1* 8/2010 Mistry et al. ................ 715/863
2010/0304787 A1* 12/2010 Lee et al. .................... 455/556.1
(Continued)

FOREIGN PATENT DOCUMENTS

WO   WO 99-34327     7/1999
WO   WO 2012-011044  1/2012

OTHER PUBLICATIONS

PCT Search Report, PCT/US2012/024267, Intel Corporation et al, Oct. 12, 2012, 9 pages.

*Primary Examiner* — Jin-Cheng Wang
(74) *Attorney, Agent, or Firm* — Blakely, Sokoloff, Taylor & Zafman LLP (57) ABSTRACT

The creation of augmented reality is described using a real scene. In one example, a process includes observing a real scene through a camera of a device, observing a user gesture through the camera of the device, presenting the scene and the gesture on the display of the device, generating a virtual object and placing it in the scene based on the observed user gesture, and presenting the virtual object in the real scene on the display.

22 Claims, 8 Drawing Sheets

(51) Int. Cl.
   *G06F 3/0486* (2013.01)
   *G06T 19/00* (2011.01)
   *G06F 3/0488* (2013.01)
   *H04N 5/272* (2006.01)
   *A63F 13/65* (2014.01)
   *A63F 13/213* (2014.01)
   *A63F 13/42* (2014.01)
   *A63F 13/92* (2014.01)
   *G06F 1/16* (2006.01)
   *G06F 3/01* (2006.01)
   *G06F 3/0481* (2013.01)
   *G06F 3/00* (2006.01)

(56) References Cited

U.S. PATENT DOCUMENTS

| | | |
|---|---|---|
| 2011/0107216 A1 | 5/2011 | Bi |
| 2011/0216060 A1* | 9/2011 | Weising et al. ............... 345/419 |
| 2012/0038668 A1* | 2/2012 | Kim et al. .................... 345/633 |
| 2012/0038669 A1* | 2/2012 | Lee et al. ..................... 345/633 |
| 2012/0081393 A1* | 4/2012 | Kim ............................. 345/633 |
| 2012/0113223 A1* | 5/2012 | Hilliges et al. ................ 348/46 |
| 2012/0206558 A1* | 8/2012 | Setton ....................... 348/14.03 |
| 2012/0206560 A1* | 8/2012 | Setton ....................... 348/14.08 |
| 2012/0288126 A1* | 11/2012 | Karkkainen et al. .......... 381/309 |
| 2013/0024819 A1* | 1/2013 | Rieffel et al. ................. 715/848 |
| 2013/0215148 A1* | 8/2013 | Antonyuk et al. ............ 345/633 |
| 2013/0290876 A1* | 10/2013 | Anderson et al. ............ 715/761 |

\* cited by examiner

AUGMENTED REALITY CREATION USING A REAL SCENE

CROSS-REFERENCE TO RELATED APPLICATION

This patent application is a U.S. National Phase Application under 35 U.S.C. §371 of International Application No. PCT/US2012/024267, filed Feb. 8, 2012, entitled "AUGMENTED REALITY CREATION USING A REAL SCENE".

BACKGROUND

Augmented Reality (AR) includes techniques for showing virtual objects superimposed over an image of a real place. In a simple example, the image is a view of a street that includes a restaurant and this reality is augmented by adding the name of the restaurant superimposed over the image of the restaurant. This has been expanded to include menus, reviews, friends that are inside, and other information. The image may be a video sequence of images. Smartphone applications have been proposed or developed which allow the user to point a camera phone at a location and see the location on the smartphone display. The application then obtains data about the location, such as restaurant names, etc. and then augments the reality shown in the smartphone display with the names, menus, reviews, etc.

AR techniques have also been used to mix real world video with three-dimensional graphics. In one example AR is used to superimpose virtual people or animals over a video feed of a real scene. In some cases, the real scene is observed by a camera and a person standing in the scene can then make gestures that are observed by the camera and used to provide interactivity between the real person and the virtual person or animal. This interaction between the real person and the virtual person cannot be seen directly by the real person, but through a display that shows the augmented reality view. This view includes the real scene, the real person, and the virtual person.

A further AR development has real objects in the scene being enhanced or converted to virtual objects that interact with other virtual objects or people. So for example, a real candy can turn into virtual explosives and a real picture of a television can virtually display television channels. These types of AR techniques provide entertainment and novelty. With improvement, AR techniques may be used for game play, training, and teaching. Augmented reality (AR) allows users to see additions to a real-time scene by having additional elements added to or projected over a live video stream. AR is already used in many applications for navigation, advertising, and gaming. However, the use of AR is limited by the amount of interesting content and the number of interesting applications.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the present invention provide end users with more ways to create compelling content. Easy-to-use approaches leverage existing technology to allow end users to create AR content. These methods continue to become more compelling as the technologies become cheaper, smaller, and allow better resolution and video analysis.

Users are allowed to create augmented reality experiences, either as stand-alone experiences or as part of a game or instructional materials. By the user inserting his or her hand over the scene, the user may make AR additions in real time over the scene. Voice and eye tracking input may be used to further enhance the process. In other words, the user may place a hand in front of a device camera and make edits to a real-time scene.

Figure 1:
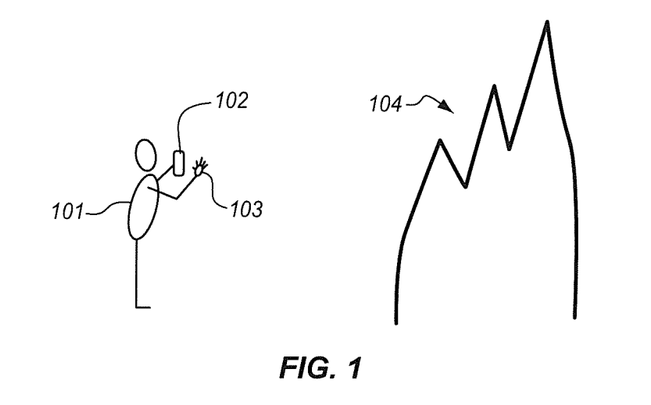
FIG. 1 is a diagram of a user before a real scene holding an AR device and performing edits with a hand in front of a rear facing camera according to an embodiment of the invention.

In the diagram of FIG. 1 a user 101 is holding a device 102 between himself and a scene 104. The device has a rear camera facing the scene and so by turning on the camera, the user can hold his hand 103 between the device and the scene and the camera will see his hand in front of the scene. The camera's view of the hand and the scene can be presented on a front display of the device for the user to see. Many portable devices, such as smart phone, portable gaming devices, media players, tablet computers, cameras and many more, feature a touch screen on the front side and a rear camera on the opposite side. This configuration allows the scene viewed by the rear camera to be seen on the front display. FIG. 1 shows that a user can also bring his hand around behind the device so that his hand is also visible in the display.

Figure 2A:
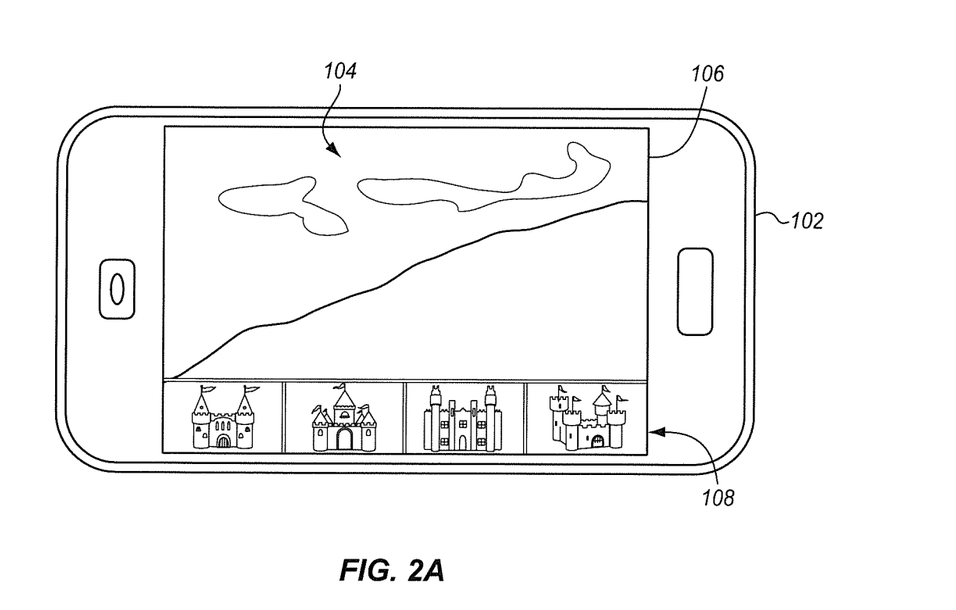
FIG. 2A is a diagram of a real scene displayed in an AR device with a palette of AR objects according to an embodiment of the invention.

FIG. 2A shows a display 106 of the device 102 in the situation of FIG. 1 before the user reaches a hand around to the back side of the device. The display shows the rear camera's view of the scene 104. In addition, a filmstrip or palette 108 of AR objects is shown along an edge, in this case the bottom edge of the display.

Figure 2B:
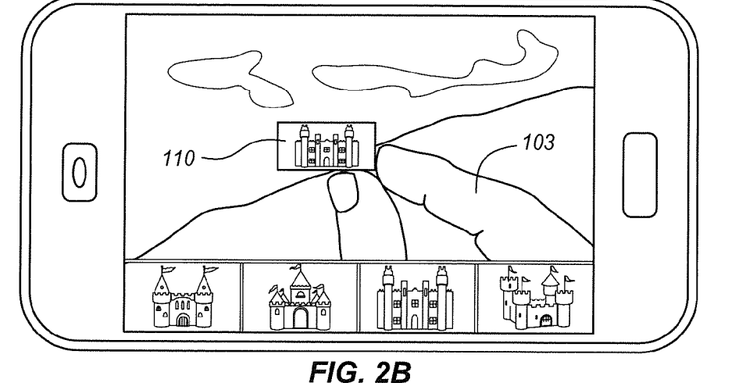
FIG. 2B is a diagram of a real scene displayed in an AR device in which the user has selected an AR object from the palette of AR objects according to an embodiment of the invention.

In FIG. 2B, the user 101 has moved his hand 102 around into view of the rear camera. The camera, therefore is also shown in the display as seen by the camera. The user may select an AR castle 110 from the choice of castles presented on the filmstrip 108 and then use a gesture in front of the camera to place the AR castle onto the scene. In FIG. 2B, the user has selected a castle, which may be done by the hand on the rear side of the device observed by the rear camera or using a touch surface on the display.

As an alternative to using a touch screen on the front side of the device. The device may also have a front camera. Such a camera is commonly used on smart phones to allow for video calls. The user may gesture in front of the front camera to grasp the castle and then place the castle in the scene using either the front or the rear camera. The user can readily switch between touch screen and gestures as desirable.

Figure 2C:
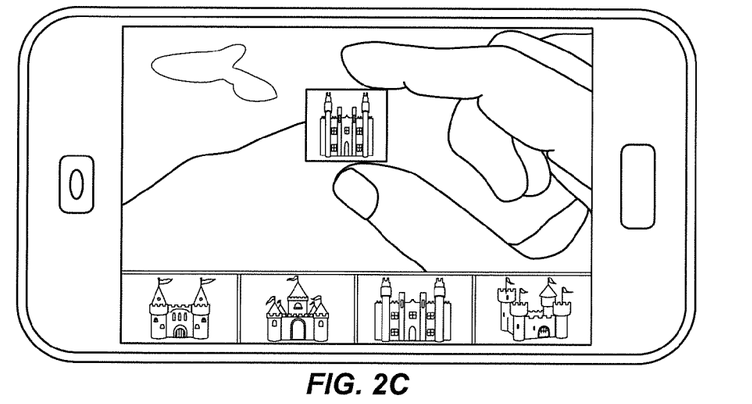
FIG. 2C is a diagram of a real scene displayed in an AR device in which the user is editing the selected AR object according to an embodiment of the invention.

The user may then adjust the size and shape of the castle as shown in FIG. 2C. The user may use pinching gestures to adjust the size in width and height, as well as the location on the scene. One of the advantages of gesturing on the "live" content by gesturing in front of the camera, compared to using the touch screen on a stable image of the scene, is that the user can quickly make additions or edits across a range of scenes of the surrounding environment that can be framed by the camera. In other words, the user is not constrained to a screen image. The user may make edits to a real scene that is beyond any one view of the real camera. The user can point the rear camera at one location of the real scene and e.g. add virtual objects, then point the camera at another location on the real scene and add more virtual objects. The AR device or a central device can remember the actions of the user so that whenever the AR device is again pointed to the location, the virtual objects again appear. In one example, the user puts a virtual castle on one hill and another virtual castle on another hill. In a game context, the virtual knights and horses of one castle may then be unleashed on the other and the action can be seen through the AR device by moving the device around to obtain different views. As a result, the AR interaction of the real scene is not limited by the field of view of the rear camera.

In FIG. 2C, the user is using a pulling gesture in front of the rear camera to increase the height of the castle. The user may observe the appearance of his own hand, the scene and the virtual castle 110 to determine when the AR castle has the desired size relative to the scene. Based on existing technologies, the system is able to blend the AR element with the live background to create a visually appealing image stream.

Figure 2D:
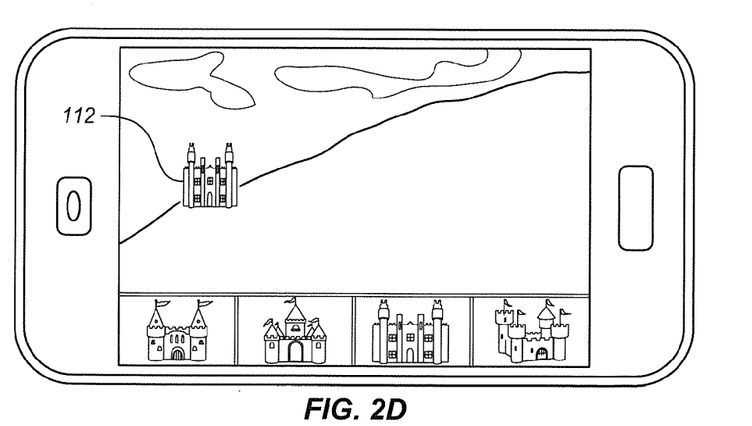
FIG. 2D is a diagram of a real scene displayed in an AR device in which the user has positioned a selected AR object into the scene according to an embodiment of the invention.

In FIG. 2D, the user has placed the AR castle 110 onto a particular location in the scene and then removed his hand from the camera's field of view. The fixed castle 112 appears on the hillside of the scene in the view of the camera. The object's position, appearance, and size may be stored locally in the AR device and in a central location or communicated directly to friends so that it appears as an augmented reality object on the hillside when any user views the hillside through an AR device. By determining the location of the castle it may be displayed on different AR devices that are in different locations but pointing at the same real scene. It may also be scaled based on the distance between the position of the hillside location and the AR device. When the AR device is far away, as shown in FIG. 2D, then the castle appears small. However, if the same or another AR device is near the castle, then the castle may fill the display or more than fill the display.

Figure 3A:
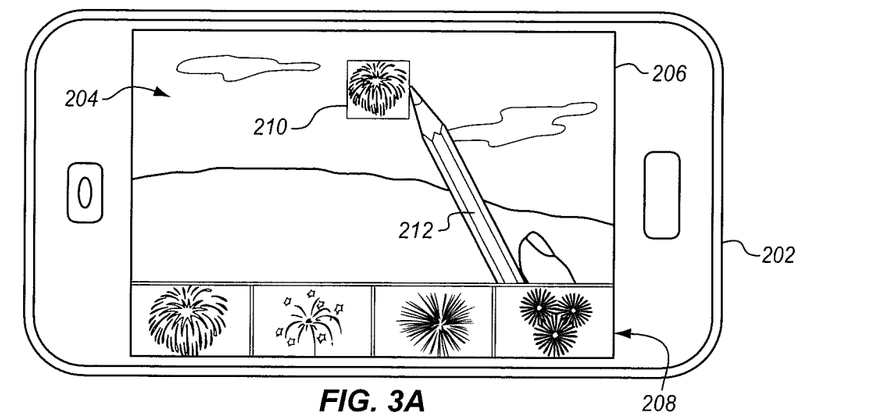
FIG. 3A is a diagram of a real scene displayed in an AR device in which the user has selected and positioned an AR object using a pencil according to an embodiment of the invention.

FIG. 3A shows a different user of the AR device and its camera with the user's hand and gestures positioned in front of the rear camera. In this example, the user is able to design the paths of inanimate and animate objects, such as fireworks or animals.

FIG. 3A shows a scene 204 observed by the rear camera of the device and presented on the device's front display 206. The display includes a filmstrip or palette 208 of different fireworks types. As in the example of FIG. 2A the user is able to select one of the fireworks types and then using a hand in the field of view of the camera is able to lay out one element in a fireworks display. The user in this way, by selecting a fireworks type and positioning it on the scene is able to create a sequence of AR fireworks effects that are defined by type and location. A time scale may also be used to control the timing of each of the fireworks. In addition, the fireworks may be scaled in the same way that the castle was scaled in FIGS. 2B and 2C.

As a further alternative, the user in FIG. 3A is shown using a pencil 212 instead of his bare hand 103. The pencil allows for a more precise pointing instrument but does not allow for the range of gestures that a hand provides. Because the user is not actually touching any surface with the pencil, no particular type of pencil is required. The gestures to select a picture tile 210 from the filmstrip 208 and to place it in a position in the scene 204 may be performed with any pencil or pen or any other device suitable for pointing, such as a stylus, a pocket knife, a nail, a mascara bottle or brush, a lipstick tube, etc.

Figure 3B:
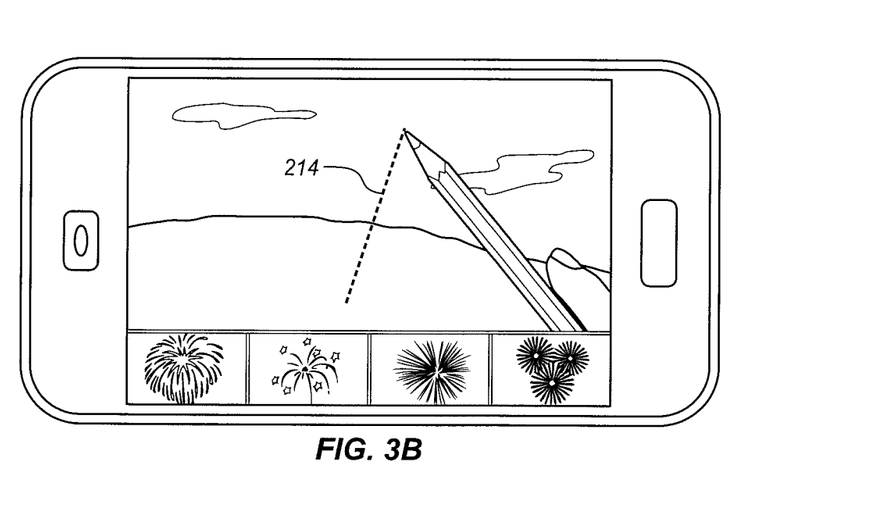
FIG. 3B is a diagram of a real scene displayed in an AR device in which the user has indicated a path for an AR object using a pencil according to an embodiment of the invention.

In FIG. 3B, the user draws a path 214 for the AR firework rocket to travel on the scene before it explodes. This may be done by selecting a path command on the palette 208 (not shown) and then tracing a line in front of the rear camera as shown. Tapping or shaking gestures may be used to indicate the start and stop of the path. The fireworks may in this way be caused to all launch from one or two location in the scene on the hill or from behind the hill and then explode in the air in different locations much like a real fireworks show.

Once completed, the fireworks show may be shown later using the display of the AR device directed toward the screen. The show could be shown later, for example at nighttime in the same location. In addition to selecting various fireworks to be shown with various timing in various parts of the scene, the user may also specify a path through the air for a given fireworks shell.

Figure 4A:
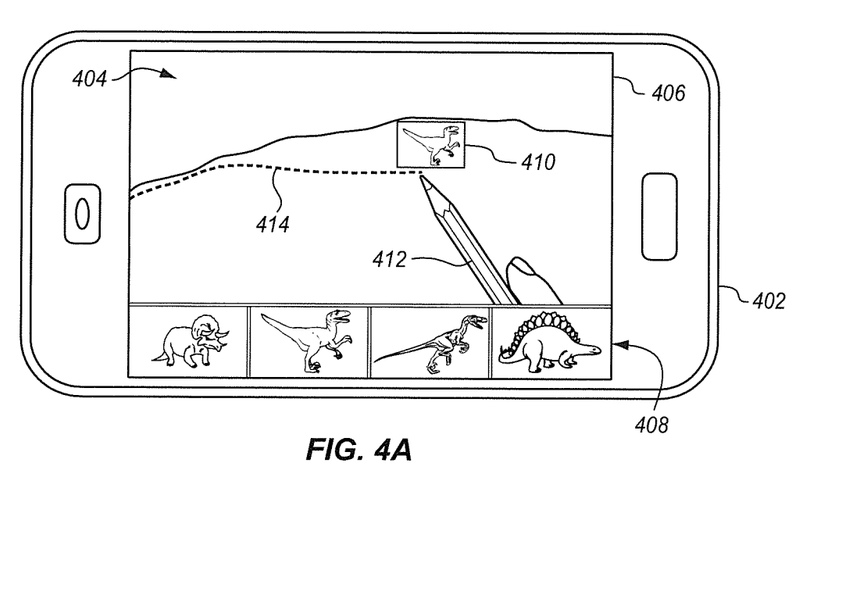
FIG. 4A is a diagram of a real scene displayed in an AR device in which the user has selected and positioned an AR object and indicated a path using a pencil according to an embodiment of the invention.

FIG. 4A shows the same technique applied to a different AR character. In this example, the AR character palette 408 shows a variety of different dinosaurs on the display 406 of the device 402 from which the user may select using a pencil 412 or hand 103 gestures. The user has selected one of the dinosaurs 410 and placed it on the scene 404. With the pen, the use may then draw a path 414 for the dinosaur to travel in AR across the scene.

Figure 4B:
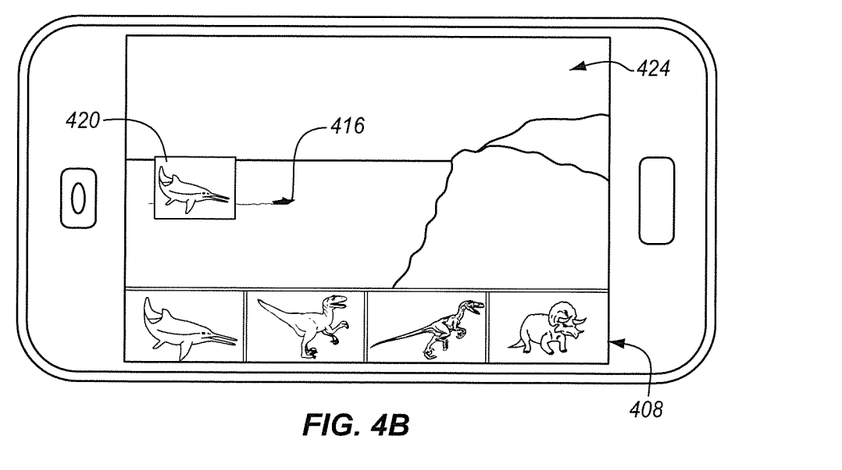
FIG. 4B is a diagram of a real scene displayed in an AR device in which the user has selected and positioned an AR object using a pencil according to an embodiment of the invention.

Similarly, in FIG. 4B, the user has selected a different dinosaur 420, a sea creature and placed the creature in the sea of a different scene 424. The different scene is obtained by moving the AR device 402 to point the camera at a new location.

The dinosaurs are to show that the AR characters or objects may be any type of object suitable for the implementation. Selecting fireworks from a set of AR characters may be associated with selecting a particular behavior. The fireworks may include programming to travel up an indicated virtual path or a default path with a rocket appearance, explode with a noise and then slowly fall to earth in pieces. The dinosaur AR character on the other hand may be associated with selecting a different virtual behavior such as walking and growling along a path. The sea creature may be associated with breaching up and out of the sea and then disappearing back into the water along a designated path.

Any of a variety of different AR characters and associated behaviors may be selected. Even the castle 110 may be associated with behaviors such as raising flags, turning lights on or off, etc. For a more complex system, selecting the castle may invoke AR behaviors from visitors, cannons, horses, trumpeters, etc. The system may also provide for interactions between the characters. If the user places a castle in one part of the scene and a mounted knight in another part of the scene, then the system may produce an AR behavior for the knight to ride to the castle and call out to the king of the castle for admittance.

AR character behaviors may also be triggered by behaviors of other AR characters or of real people, creatures, or objects in the scene. If the scene contains a real castle, then the AR mounted knight may be caused to travel to that real castle and virtually announce himself to the gate keeper or the king. If the user has placed several AR characters on a scene, they may interact with each other and the scene. The dinosaurs may virtually introduce themselves to real people that come along on the scene, or virtually eat them. This may all be shown on the display 406 of the AR device 402. The sea creature may lie under the water, and then upon the appearance of a real or virtual boat 416 on the scene, the sea creature may appear and be caught be fishermen, swim alongside the boat or eat it. The interaction of AR objects and characters with real objects in the scene observed by the camera adds additional interest for the user. The interactions may be pre-programmed or controlled by the user using the AR device through a control surface, gestures in front of the rear or front camera, or by operating a peripheral controller.

Figure 5A:
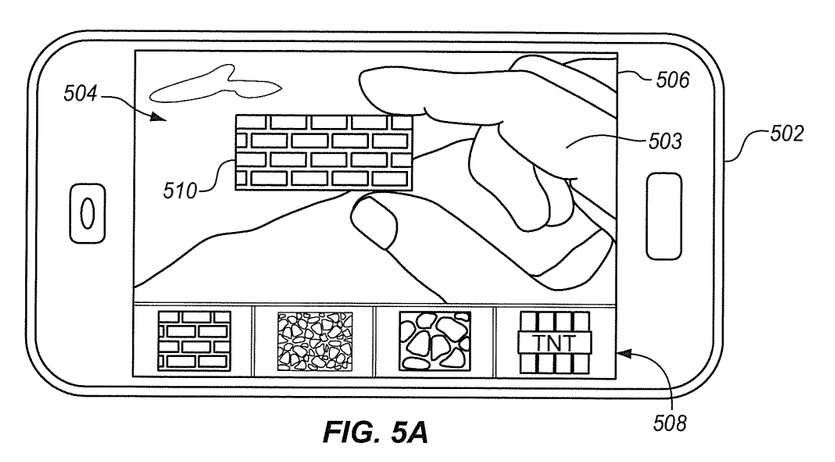
FIG. 5A is a diagram of a real scene displayed in an AR device in which the user has selected a building element for construction of an AR object according to an embodiment of the invention.

FIG. 5A shows a user 101 placing a hand 503 in front of a rear camera of an AR device 502 and performing gestures to virtually lay out building elements 508, such as a brick wall 510, against a scene 504 for a building game such as Minecraft. The user's hand 503 is shown in the display 506 of the AR device as if it is actually manipulating the virtual building elements. This view may be generated in the same way as for the previous example figures in which the user's hand is manipulating virtual elements against a scene. The use may build any number of structures on the real scene similar to how the castle is built in FIGS. 2A through 2D.

Figure 5B:
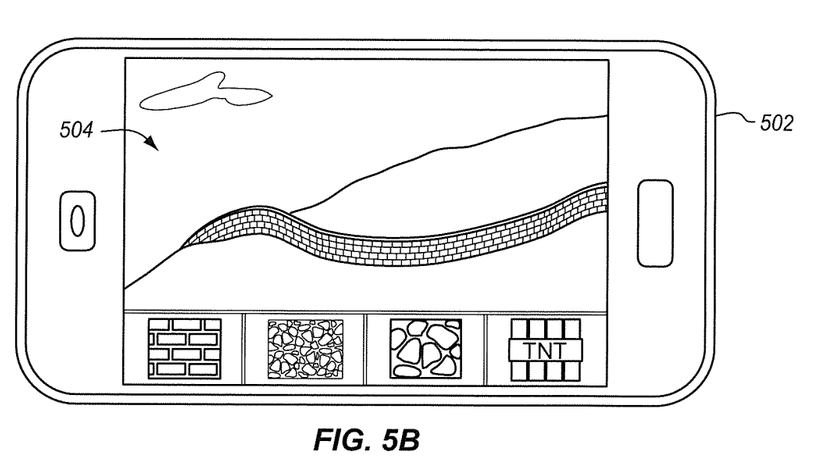
FIG. 5B is a diagram of the scene of FIG. 5A with the AR object rendered as a gaming scene according to an embodiment of the invention.

In conventional Minecraft game play, users click a mouse to choose elements and build virtual structures onto virtual scenes. Some of the building elements have special properties. As shown in FIG. 5A, the user selects a building element, and then places it over a real scene to build structures. The real scene may then be converted to a Minecraft instance of a landscape as shown in FIG. 5B. The AR device may recognize features and map them to Minecraft features to build a new Minecraft landscape. Alternatively, the AR device may select a pre-existing Minecraft landscape with some of the same features and map the newly built structures to it. Alternatively, the real scene could contain some Minecraft elements and some real elements as shown in FIG. 5A.

While the example of FIG. 5A is based on a landscape game environment, such as Minecraft, it is not so limited. The techniques of FIGS. 5A and 5B may be applied to any of a variety of different games and environments which use a simulated landscape, or built environment. Some games allow for houses and rooms to be decorated or for villages or forts to be built. Any such game may be played using hand or body gestures in front of the front camera.

In another variation a user may be able to capture an image or video stream, and then make edits using gestures in front of the rear camera. This allows more flexibility to move a framed shot of interest. In one example, a user make edits in multiple directions across a large landscape quickly. The hand gestures may be used as sliders for different editing effects and for fast shuttle or jog wheel motions forwards or backward in a video sequence. A pen or other pointer may be used to select a specific location in an image or to move through a video sequence.

In addition, hand gestures in front of the rear camera may be used to make live edits in a video stream as it is captured. For example, the user may use finger gestures to lay down markers or to call attention to a detail in the video stream. The system may automatically edit out frames that show the user's hand and only keep the AR markers that were added into the video stream. This is useful for instruction purposes, insurance claims, descriptions of work needed, etc.

While in the pictured examples, the user is looking at the display and placing a hand or instrument behind the display within the view of the rear camera of the AR device, in another aspect of the system, the user is completely in front of the camera and uses hand, arm, or body gestures to generate commands. These commands may be selection and placement of AR characters or things or the virtual construction of whole systems or villages within a game such as Minecraft. Because the user is no longer able to see the display, commands which require precise screen locations could be made using voice commands. For example, the user says "brick wall" and then uses gestures to build the virtual structure.

As a further alternative, the AR device may use eye tracking to receive gesture commands. The AR device may be fitted also with a front camera near the display. This camera may be used to track eye movements of the user. These received eye tracking inputs may be used similar to the ones described above with hand and pen gestures to place AR elements. Eye tracking may be used in conjunction with voice and gesture inputs to allow the selection of modes and element characteristics.

As described above, new and more interesting applications may be provided for AR. A user can gesture in front of a camera to make AR edits to a video stream as it is captured. The user can also take captured images that have AR edits that were done at the time of capture and do further edits after the time of capture. Voice commands or eye tracking can be used in conjunction with gestures to accomplish AR edits. Touch screen commands may also be used in conjunction with the other elements. Using all of these types of inputs including gestures in front of the rear camera, the user can lay out characters, the timing of AR elements, the paths of characters and other AR elements, and element characteristics with the AR editing system described above.

Beyond the virtual world and image the user can also use the AR editing system to trigger AR events with the occurrence of a real-world event. Such events, in addition to those above, may include the appearance of a real-world object, a time of day, recognition of the presence of another person, and the presence of a person or device at a specific location.

Figure 6:
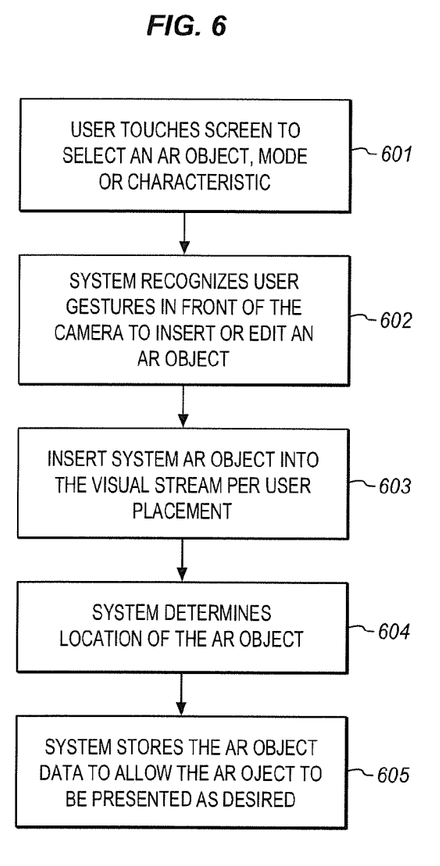
FIG. 6 is a process flow diagram of inserting an AR character into a real scene according to an embodiment of the invention.

Gestures, eye tracking, voice, keyboard presses, and mouse movements may be used to make selections of virtual characters or construction elements to build structures, environments and equipment and add these elements to real-world scenes using hand, arm, or body gestures. In addition, any of these constructions may be associated with a physical location of the scene to which the AR constructs were added. The construction and editing may be stored with the location. The location may be shown on a real-world map corresponding to the location where the AR creation was done. This location and the map can be used in game interactions or to show another person where to find AR creations FIG. 6 is a process flow diagram describing some of the interactions shown above. At 601, the user touches the screen of a touch screen device or otherwise issues a command to select an AR character, an object, a mode, or a characteristic. As mentioned above, this may be done using a wide variety of different inputs. At 602, the system recognizes user gestures made in front of a camera of the system to insert or edit the selected AR object.

Having received the commands from user interfaces and the camera, at 603, the system inserts the AR object into the visual stream that is being received at the rear camera based on the user commands. As shown above, this might inserting the castle on the hill, the fish in the sea, etc.

At 604, the system determines a location, such as a GPS (Global Positioning System) location, of the AR object on the scene behind the device and at 605, the system stores the AR object data to allow the AR object to be presented later and for the benefit of others. The AR object data may be stored on the same or another screen.

Figure 7:
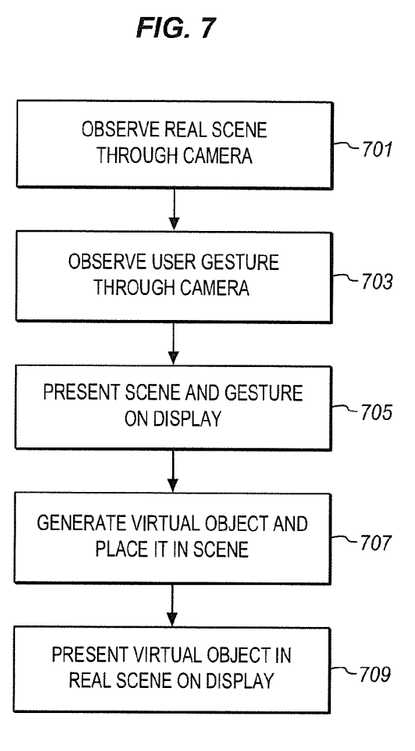
FIG. 7 is an alternative process flow diagram of inserting an AR character into a real scene according to another embodiment of the invention.

FIG. 7 is another process flow diagram for the operations described above. At 701 an AR device is configured or aimed to observe a real scene through its camera. The scene may be an exterior landscape, cityscape, interior scene or any other scene that the camera of the device can observe. The camera is on the opposite side of the device from a display so that the user can aim the device at the scene and then see the scene on the display.

At 703, a user gesture is observed through the same camera of the device. This can conveniently be done as shown in FIG. 1 by holding the device in one hand and then reaching around the device with the other hand to perform a gesture. The device may also be placed in a stand or dock or on a desk so that both of the user's hands are free. At 705, the scene and the user gestures are both observed and displayed together on the device's display.

The user gestures may be interpreted as commands. Any of a variety of different commands may be used, such as pinching, swiping, scrolling, rotating, etc. Many hand gesture commands have been developed for gaming systems with front cameras or inertial controllers and any of these may be used by the AR device as commands.

At 707, the device receives the commands created by the hand gestures and uses these to generate a virtual object and place the object in the real scene. Instead of hand gestures, the user may use finger, arm, body or any other type of gesture. Alternatively, user may use an instrument, such as a pen or pointing stick and perform gestures with the instrument. The gestures may include pointing and selecting as well as indicating zooming or sizing, rotations, and view changes. The user may in this way select, size, and position an AR object as a virtual object in the scene.

At 709, the device presents the virtual object in the real scene on its display. The scene may include all of the objects in the real scene together with any virtual objects that the user has added to the scene. The user may then provide additional gestures after this operation or before this operation to associate attributes with the virtual object. The attributes may include a path, a timing, an interaction with other objects, unique behaviors and other attributes.

Equipped with such attributes, the display may become a video or game play presentation rather than static images. The virtual objects may interact with each other and with real objects and all of this may be presented on the display. The AR device may continue to monitor the real scene and present changes to it as the scene changes. The changes may be used to affect the behavior of the virtual objects. The presentation may include not only video or photographs but also audio through a device speaker to play sound effects and virtual noises made by the virtual objects. The presentation may also include haptic effects through vibrators designed into the AR device. When a dinosaur walks along the scene for example, the device could present a boom sound and a haptic vibration as each step hits the ground.

All of the user commands delivered by gestures in front of the real camera may be augmented by other types of commands. These may include a touch screen gestures, keyboard input, and voice commands, among others.

Figure 8:
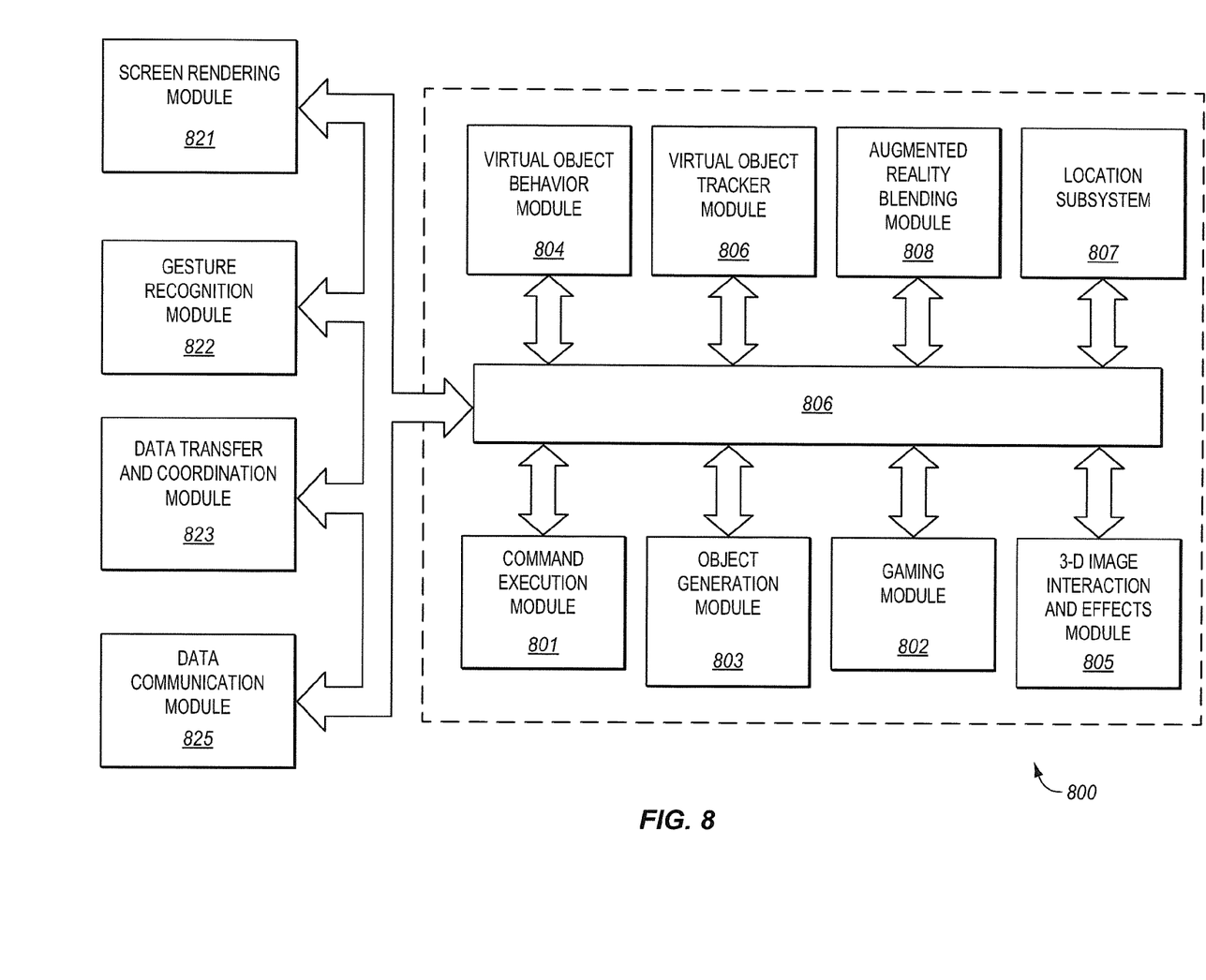
FIG. 8 is block diagram of a computer system suitable for implementing processes of the present disclosure according to an embodiment of the invention.

FIG. 8 is a block diagram of a computing environment capable of supporting the operations discussed above. The modules and systems may be implemented in a variety of different hardware architectures and form factors including that shown in FIG. 9.

The Command Execution Module 801 includes a central processing unit to cache and execute commands and to distribute tasks among the other modules and systems shown as well as to remote systems through a communications interface. It may include an instruction stack, a cache memory to store intermediate and final results, and mass memory to store applications and operating systems. The Command Execution Module may also serve as a central coordination and task allocation unit for the system.

The Screen Rendering Module 821 draws objects on the AR display for the user to see. It can be adapted to receive the data from the Virtual Object Behavior Module 804, described below, and to render virtual objects, real objects, displayed objects and any other objects and forces on the appropriate screen or screens. Thus, the data from the Virtual Object Behavior Module would determine the position and dynamics of the virtual object and associated movements, actions and sounds, for example, and the Screen Rendering Module would depict the virtual object and associated objects and environment on a screen, accordingly.

The Object and Gesture Recognition System 822 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto the real scene, or that the user made a body part gesture to move the virtual object from one location or another. The Object and Gesture Recognition System may be coupled to a camera or camera array, a microphone or microphone array, a touch screen or touch surface, or a pointing device, or some combination of these items, to detect gestures and commands from the user.

A touch screen or touch surface of the Object and Gesture Recognition System may include a touch screen sensor, a rear camera, and a front camera. Data from the sensors may be fed to hardware, software, firmware or a combination of the same to map the gesture from the user onto the screen or scene to a corresponding dynamic behavior of a virtual object. The sensor data may be used to determine momentum and inertia factors to allow a variety of momentum behavior for a virtual object based on input from the user's hand, such as a swipe rate of a user's finger relative to the scene or a screen.

The Object and Gesture Recognition System 822 may also be coupled to microphones to receive voice commands and to additional cameras to observe eye tracking and other gestures. As mentioned above, keyboard or button inputs may also be received and recognized by this module.

The Data Transfer and Coordination Module 823 works with the various computing and display resources in the system to send information regarding virtual objects and effects to other devices so that these can be presented on other displays and to other users. This module may also send audio information so that aural effects can be presented by speakers. The Data Transfer and Coordination Module may send parameters for other devices to use in determining displays or it may send completely rendered graphical effects ready for display or some other form of data depending on how computing tasks are distributed.

The Data Communication Module 825 contains the wired or wireless data interfaces that allow devices in the system to communicate. There may be multiple interfaces with each device. In one example, the AR device communicates over WiFi to send detailed parameters regarding AR characters. It also communicates over Bluetooth to send user commands and to receive audio to play through the AR device. Any suitable wired or wireless device communication protocols may be used.

The Virtual Object Behavior Module 804 is adapted to provide behaviors to a virtual object being shown on the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by the Object and Gesture Recognition System, and the Virtual Object Behavior Module would generate data that would direct the movements of the virtual object to correspond to the input commands and position.

The Virtual Object Tracker Module 806 on the other hand may be adapted to track where a virtual object should be located in the real scene in the vicinity of the display. The Virtual Object Tracker Module 806 may for example track a virtual object as it moves across the scene and track the locations of any real object or additional virtual objects that are near the virtual object. The location information for the virtual object may be combined with information from a video analysis system to aid in the superposition of the AR characters over the real scene. The module tracks the actions that should be taken when a video analysis subsystem and the Location Subsystem 807 determine the detections of objects and location The AR Blending Module 808 takes the video or still images from the camera that have been analyzed and makes the AR objects blend in with the appearance of the background. This may include determining foreground and background positions and rendering lighting, shadowing, reflections, shading and any other effects to enhance the appearance of the AR object.

The Location Subsystem 807 may use GPS (Global Positioning System), cellular telephone location, mapping software and other systems together with a compass, a barometer, and any other sensors to determine the location of the AR device and the location of the real scene. A video analysis subsystem of the Location Subsystem may be used to identify objects from an incoming video stream and show the locations of the objects on maps. Distance location mapping may be used for the image input. The video analysis subsystem may, for example estimate location information for incoming images based on GPS and visual cues in the image frame. This location can be stored for future reference, to provide to other users through the data communication module and for other purposes.

The Object Generation Module 803 provides selections to users and receives the recognized gestures to generate virtual objects and their attributes. These attributes may include appearance, size, and initial position. The Object Generation Module may be equipped with libraries of different objects and associated attributes from which virtual objects may be created. These objects may be provided to the behavior module to generate behaviors and to the tracking module for locations as well as to the rest of the system for all of the described interactions.

The Gaming Module 802 can be used to provide game play in the context of the AR characters and objects that a user constructs. The game play may include image motion, image size, and angle changes of objects in the image plane or in a three-dimensional space to provide velocity and direction effects for objects in the real scene and to add additional objects to the real scene. The Gaming Module may also provide building elements for selection by the user, such as the palettes shown along the bottom of the display. The Gaming Module may also take input from the input subsystems and the use it to allow different types of inputs to create elements in a building game.

The 3-D Image Interaction and Effects Module 805 generates a three-dimensional space including virtual and real objects and tracks virtual object interactions with displayed images and video. It then allows the objects in the three-dimensional real space to be mapped to the location in the real scene. The influence of objects in the z-axis (towards and away from the plane of the screen) can be calculated together with the relative influence of these objects upon each other. For example, an object moving about on the real scene may move towards and away from the AR device and be influenced by 3-D objects in the foreground. These objects may change the direction or velocity of AR character. The object can be rendered by the 3-D Image Interaction and Effects Module in the foreground using a 3-D presentation technology on the display.

Figure 9:
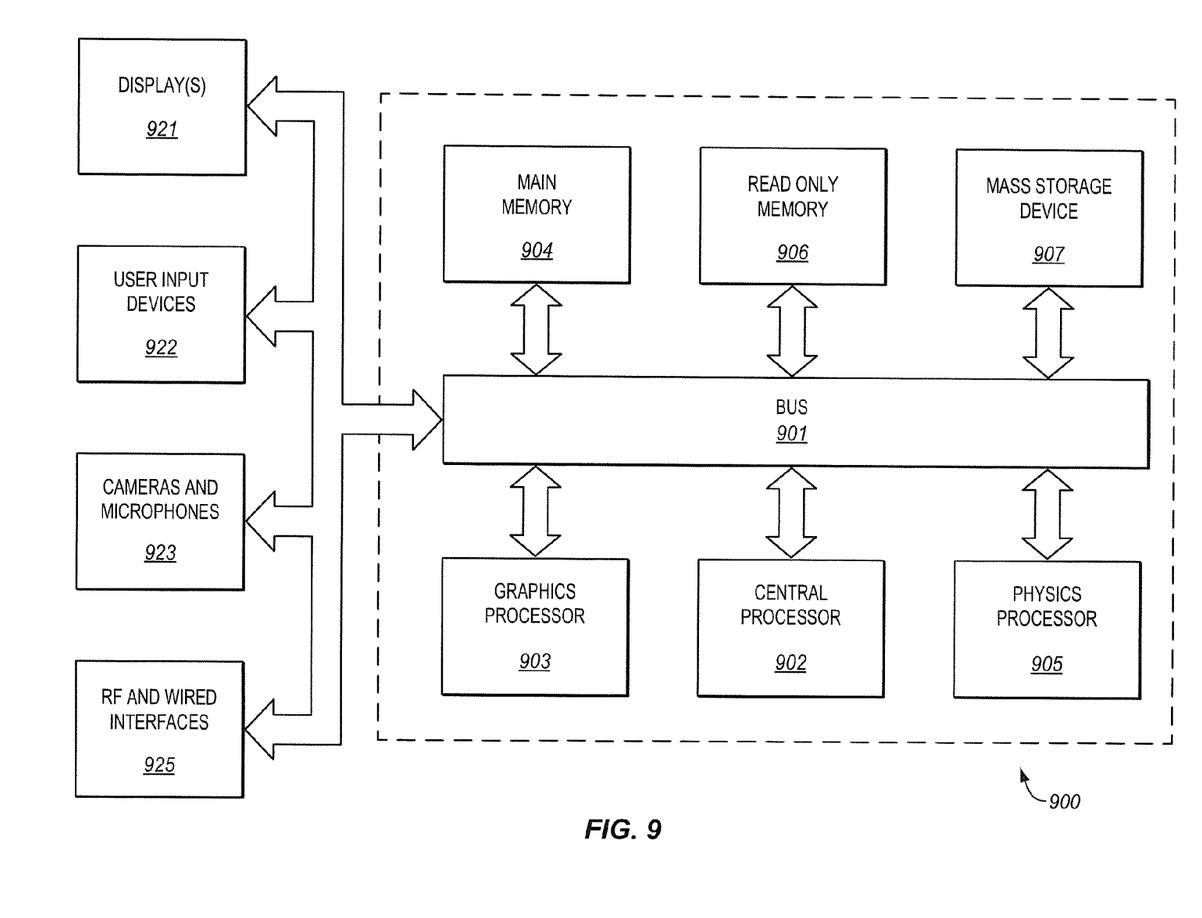
FIG. 9 is a block diagram of a an alternative view of the computer system of FIG. 8 suitable for implementing processes of the present disclosure according to an embodiment of the invention.

FIG. 9 is a block diagram of a computing system suitable for use as the AR device described above, such as a personal computer, tablet or slate computer, gaming console, smartphone or portable gaming device. Alternatively, the AR device 900 may be a media system although the system is not limited to this context. For example, the system may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

The AR device computer system 900 includes a bus or other communication means 901 for communicating information, and a processing means such as a microprocessor 902 coupled with the bus 901 for processing information. The computer system may be augmented with a graphics processor 903 specifically for rendering graphics through parallel pipelines and a physics processor 905 for calculating physics interactions as described above. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the exemplary systems 800 and 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:
1. A method comprising:
observing a real scene through a camera of a device;
observing a user selection gesture to select a virtual object from among a plurality of virtual objects that are displayed as selectable options on a display of the device;

observing a user placement gesture through the camera of the device, the gesture to place the selected virtual object onto a particular location in the real scene;

presenting the real scene, the selection gesture and the placement gesture on the display of the device;

generating the selected virtual object based on the observed user selection gesture and placing it in the real scene based on the observed user placement gesture after observing the user selection and the user placement gesture;

presenting, after generating and placing the selected virtual object, the selected virtual object at the particular location in the real scene on the display when the camera is directed at the particular location, the selected virtual object being generated by the device and presented in the real scene being imaged by the camera at the same time;

observing further user gestures through the camera of the device, the further user gestures to draw a path on the real scene;

determining a path of movement of the selected virtual object across the real scene based on the further user gestures; and showing, after generating and placing the selected virtual object and determining path of movement, the selected virtual object moving across the determined path on the real scene at a later time on the display, when the camera is directed at the particular location, the selected virtual object being generated by the device and the real scene being imaged by the camera at the same time.

2. The method of claim 1, further comprising recording the showing of the selected visual object moving across the determined path on the real scene for later presentation.

3. The method of claim 1, further comprising
observing further user gestures through the camera of the display; and
modifying characteristics of the virtual object based on the further user gestures.

4. The method of claim 3, wherein the characteristics comprise size and rotational position.

5. The method of claim 3, wherein the characteristics comprise behavior of the virtual object in time, and wherein the timing of the behavior is controlled using a time scale.

6. The method of claim 1, further comprising:
tracking a location of the virtual object in the real scene as the virtual object moves through the real scene; and
updating the presentation of the virtual object on the display using the tracked location and a behavior associated with the virtual object so that the virtual object performs the associated behavior while moving across the determined path.

7. The method of claim 6, further comprising:
presenting real objects in the real scene on the display;
presenting an interaction between the real objects and the virtual objects on the display; and
presenting the effect of the interaction on the real object on the display.

8. The method of claim 7, wherein presenting an interaction comprises presenting an interaction when the tracked location of the virtual object is proximate a real object, the interaction being triggered by the proximity and being determined by a stored characteristic in the form of a behavior associated with the virtual object.

9. The method of claim 1, further comprising determining a location of the virtual object in the real scene and storing a record of the location.

10. The method of claim 9, further comprising transferring data regarding the virtual object location to another device for display on the other device.

11. The method of claim 1, further comprising presenting audio representations of the virtual object in the real scene, and modifying the audio representations using the tracked location.

12. The method of claim 1, further comprising receiving an additional command as at least one of a touch screen gesture, a keyboard input, and a voice command and wherein generating the virtual object comprises generating the virtual object using the received additional command.

13. The method of claim 1, wherein observing a user selection gesture comprises observing a user selection gesture through the camera of the device.

14. A computer-readable non-transitory medium having instructions stored thereon that, when executed by the computer, cause the computer to perform operations comprising:
observing a real scene through a camera of a device;
observing a user selection gesture to select a virtual object from among a plurality of virtual objects that are displayed as selectable options on a display of the device;
observing a user placement gesture through the camera of the device, the gesture to place the selected virtual object onto a particular location in the real scene;
presenting the real scene, the selection gesture and the placement gesture on the display of the device;
generating the selected virtual object based on the observed user selection gesture and placing it in the real scene based on the observed user placement gesture after observing the user selection and the user placement gesture;
presenting, after generating and placing the selected virtual object, the selected virtual object at the particular location in the real scene on the display when the camera is directed at the particular location, the selected virtual object being generated by the device and presented in the real scene being imaged by the camera at the same time;
observing further user gestures through the camera of the device, the further user gestures to draw a path on the real scene;
determining a path of movement of the selected virtual object across the real scene based on the further user gestures; and
showing after generating and placing the selected virtual object and determining path of movement, the selected virtual object moving across the determined path on the real scene at a later time on the display, when the camera is directed at the particular location, the selected virtual object being generated by the device and the real scene being imaged by the camera at the same time.

15. The medium of claim 14, the operations further comprising:
presenting real objects in the real scene on the display;
tracking a location of the virtual object in the real scene as the virtual object moves through the real scene;
updating the presentation of the virtual object on the display using the tracked location and a behavior associated with the virtual object so that the virtual object performs the associated behavior while moving across the determined path;
presenting an interaction between the real objects and the virtual objects on the display; and
presenting the effect of the interaction on the real object on the display.

16. The medium of claim 15, wherein presenting an interaction comprises presenting an interaction when the tracked location of the virtual object is proximate a real object, the interaction being triggered by the proximity and being determined by a stored characteristic in the form of a behavior associated with the virtual object.

17. A device comprising:
a gesture recognition module to observe a real scene through a camera of a device and to observe a user gesture through the camera of the device, the gesture recognition module to observe a user selection gesture to select a virtual object from among a plurality of virtual objects that are displayed as selectable options on a display of the device, to observe a user placement gesture to place the selected virtual object onto the real scene through the camera of the device, and to observe further user gestures to draw a path on the real scene through the camera of the device;
a screen rendering module to present the real scene, the selection gesture, and the placement gesture over the real scene on a display of the device;
an object generation module to generate a virtual object based on the observed user selection gesture after observing the user selection gesture; and
a virtual object tracker module to place the generated virtual object in the real scene based on the observed user placement gesture after observing the user selection and the user placement gesture, and to determine a path of movement of the selected virtual object across the real scene based on the further user gestures;
wherein the screen rendering module is further to present, after generating and placing the selected virtual object and determining a path of movement, the virtual object in the real scene on the display, and to show the selected virtual object moving across the determined path on the scene at a later time on the display, when the camera is directed at the particular location, the selected virtual object being generated by the device and the real scene being imaged by the camera at the same time.

18. The device of claim 17, further comprising a virtual object behavior module to modify behavior characteristics of the virtual object for future presentation based on the further user gestures.

19. The device of claim 18, wherein the characteristics comprise size and rotational position.

20. A system comprising:
a rear camera to observe a real scene and to observe a user selection gesture to select a virtual object from among a plurality of virtual objects that are displayed as selectable options on a display of the system, a user placement gesture to place the selected virtual object onto the real scene, and further user gestures to draw a path on the real scene;
a processor to generate the selected virtual object based on the observed user selection gesture after observing the user selection gesture, to place it in the real scene based on the observed user placement gesture after observing the placement gesture, and to determine a path of movement of the selected virtual object across the real scene based on the further user gestures after the observing the further user gestures;
a display to present the virtual object in the real scene and the gestures, and to show the selected virtual object moving across the determined path on the scene at a later time on the display, when the camera is directed at the particular location, the selected virtual object being generated by the processor and the real scene being imaged by the camera at the same time; and
a speaker to present a sound effect associated with the displayed virtual object.

21. The system of claim 20, further comprising a touch screen to sense user gestures and wherein the processor generates a virtual object based on a selection from among a plurality of virtual objects selected by touching the touch screen.

22. The system of claim 20, further comprising a location subsystem to determine a location of the virtual object in the real scene and a storage device to store a record of the location.

* * * * *